US012184005B2

(12) United States Patent
Hsieh et al.

(10) Patent No.: US 12,184,005 B2
(45) Date of Patent: Dec. 31, 2024

(54) CONNECTOR AND METHOD FOR MANUFACTURING THE SAME

(71) Applicant: Unimicron Technology Corp., Taoyuan (TW)

(72) Inventors: Ching-Ho Hsieh, Taoyuan (TW); Ming-Hsing Wu, Taoyuan (TW); Keui-Sheng Wu, Taoyuan (TW)

(73) Assignee: Unimicron Technology Corp., Taoyuan (TW)

( * ) Notice: Subject to any disclaimer, the term of this patent is extended or adjusted under 35 U.S.C. 154(b) by 373 days.

(21) Appl. No.: 17/661,282

(22) Filed: Apr. 28, 2022

(65) Prior Publication Data

US 2023/0291139 A1 Sep. 14, 2023

(30) Foreign Application Priority Data

Mar. 8, 2022 (TW) ................................. 111108433

(51) Int. Cl.
*H01R 13/17* (2006.01)
*H01R 12/70* (2011.01)

(52) U.S. Cl.
CPC ......... *H01R 13/17* (2013.01); *H01R 12/7076* (2013.01)

(58) Field of Classification Search
CPC ........ H01R 13/15; H01R 13/17; H01R 12/70; H01R 12/7076; H01R 12/71; H01R 12/55; H01R 12/57; H01R 12/58; H01R 12/7082; H01R 12/712; H01R 12/714
USPC ........................................................... 439/55
See application file for complete search history.

(56) References Cited

U.S. PATENT DOCUMENTS

| | | | | |
|---|---|---|---|---|
| 10,116,080 | B1 * | 10/2018 | Ju ........................ | H01R 12/714 |
| 2001/0001748 | A1 | 5/2001 | Ochiai | |
| 2007/0020960 | A1 * | 1/2007 | Williams ............... | H01R 12/52 439/66 |
| 2017/0365947 | A1 * | 12/2017 | Costello ............ | H01R 13/2442 |
| 2018/0351277 | A1 | 12/2018 | Beaman | |
| 2020/0295480 | A1 | 9/2020 | Chen | |

(Continued)

FOREIGN PATENT DOCUMENTS

| | | | |
|---|---|---|---|
| CN | 2548394 | Y | 4/2003 |
| CN | 102646913 | B | 8/2016 |
| CN | 107528139 | A | 12/2017 |

(Continued)

*Primary Examiner* — Abdullah A Riyami
*Assistant Examiner* — Amara Anderson
(74) *Attorney, Agent, or Firm* — CKC & Partners Co., LLC

(57) ABSTRACT

A connector includes a substrate, a coverlay and a spring contact. The substrate has a first surface, a second surface opposite to the first surface and a conductive through hole extending between the first and second surfaces. The coverlay is disposed on the first surface and includes a first opening. The spring contact includes an anchor member, a rising member and a pin. The anchor member is disposed between the substrate and the coverlay. The rising member extends from the anchor member and through the first opening in a direction away from the substrate. A first portion of the rising member is in the first opening, and a second portion of the rising member is out of the first opening. The pin extends from the anchor member to an inside of the conductive through hole, and is electrically connected to the conductive through hole.

18 Claims, 13 Drawing Sheets

(56) References Cited

U.S. PATENT DOCUMENTS

2020/0313333 A1 10/2020 Ho

FOREIGN PATENT DOCUMENTS

TW 201134015 A 10/2011
TW 201524050 A 6/2015

* cited by examiner

CONNECTOR AND METHOD FOR MANUFACTURING THE SAME

CROSS-REFERENCE TO RELATED APPLICATION

This application claims priority to Taiwan Application Serial Number 111108433 filed Mar. 8, 2022, which is herein incorporated by reference in its entirety.

BACKGROUND

Field of Invention

The present disclosure relates to a connector and a method for manufacturing the same, and particularly to a connector with a pin and a method for manufacturing the same.

Description of Related Art

The electronic device has been developed for fast speed, high reliability, multiple functions, being in miniature, and high performance. Thus, the circuit board applied in the electronic device becomes important for advances in the electronic device. To increase the application scope of the circuit board, various types of spring contacts can be disposed in the circuit board to electrically connect the circuit board and other electric components (e.g., other circuit board) for signal transmission or power supply.

SUMMARY

An aspect of the present disclosure provides a connector including a substrate, a coverlay and a spring contact. The substrate has a first surface, a second surface opposite to the first surface and a conductive through hole extending between the first and second surfaces. The coverlay is disposed on the first surface and includes a first opening. The spring contact includes an anchor member, a rising member and a pin. The anchor member is disposed between the substrate and the coverlay. The rising member extends from the anchor member and through the first opening in a direction away from the substrate. A first portion of the rising member is in the first opening, and a second portion of the rising member is out of the first opening. The pin extends from the anchor member to an inside of the conductive through hole, and is electrically connected to the conductive through hole.

An aspect of the present disclosure provides a method for manufacturing a connector including providing a substrate having a first surface, a second surface opposite to the first surface, and a conductive through hole extending between the first surface and the second surface. The method further includes providing a first coverlay and first spring contacts attached to the first coverlay. The first coverlay includes a first opening. Each of the first spring contacts includes an anchor member connected to the first coverlay, a rising member extending from the anchor member, through the first opening and above the first opening, and a pin extending from the anchor member in a direction away from the first opening. The method further includes disposing the first coverlay and the first spring contacts attached to the first coverlay onto the first surface of the substrate. The anchor member is between the substrate and the first coverlay. The method further includes inserting the pin into the conductive through hole, and electrically connecting the pin and the conductive through hole.

The present disclosure discloses various embodiments to provide a connector and a method for manufacturing the same. A spring contact of the connector is designed to include a pin. The connector can be electrically connected to a conductive through hole by inserting the pin into the conductive through hole to make the pin directly contacts the conductive through hole. Thus, the method for manufacturing the connector can be simplified.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

A method of manufacturing a connector may include an etching process, an electroplating process, or a seed layer formation process before the electroplating process to electrically connecting a conductive spring contact and a substrate. It is not easy to achieve a desirable yield of a connector as the number of manufacturing process is increased, thereby the cost may be increased. Various embodiments in the present disclosure provide a connector manufactured by a simplified way. A spring contact of the connector is designed to include a protruding pin. The spring contact can be electrically connected to a conductive through hole of a substrate by inserting the pin into the conductive through hole and making the pin directly contacts the conductive through hole, without implementing some processes such as the electroplating process or the seed layer formation process. Thus, an operation of manufacturing the connector can be simplified, thereby reducing the cost and improving the yield of the connector.

Figure 1:
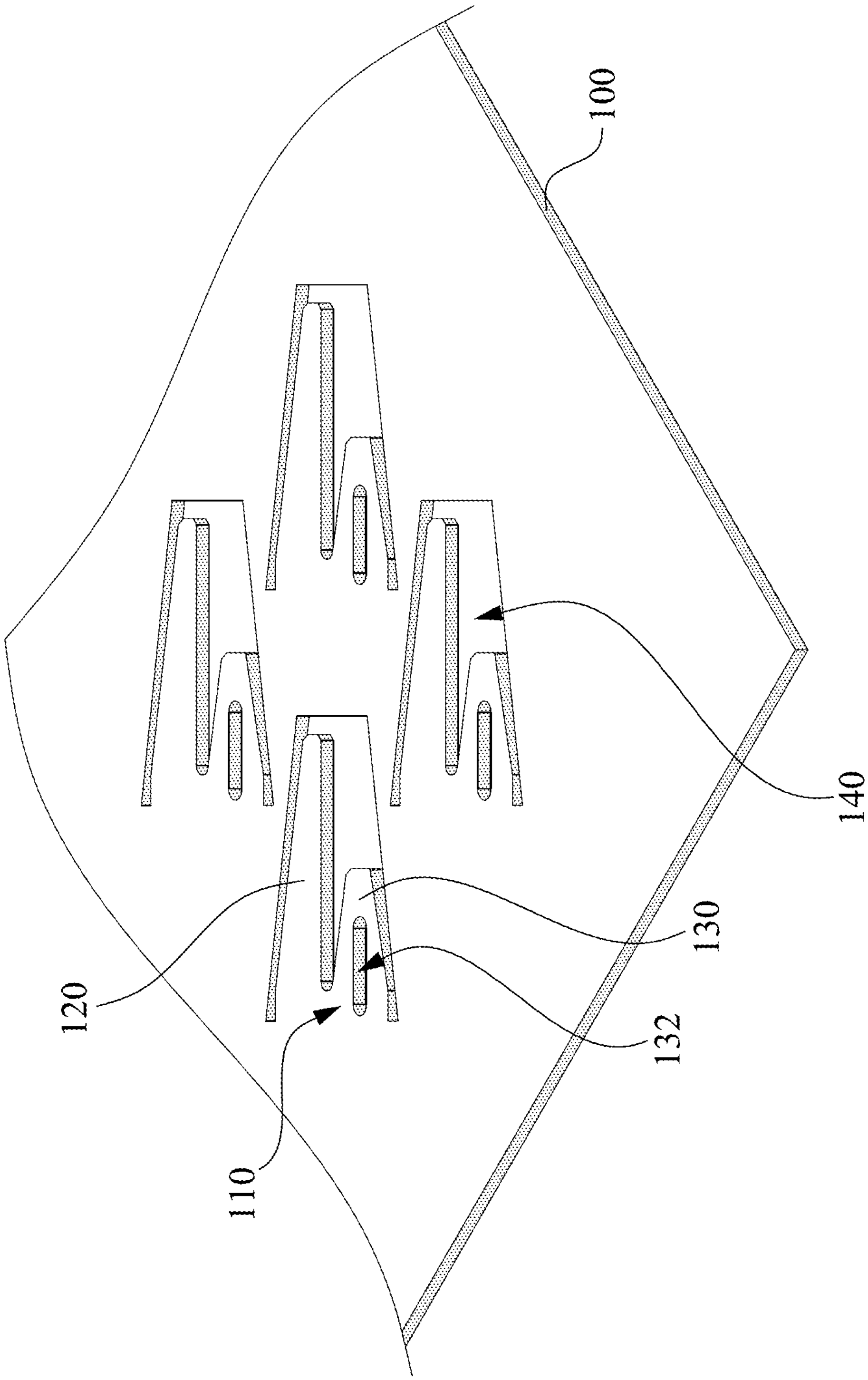
FIG. 1, FIG. 2, FIG. 3A, FIG. 3B, FIG. 3C, FIG. 4A, FIG. 4B, FIG. 4C and FIG. 4D are views at various stages of a method for manufacturing a spring contact according to some embodiments of the present disclosure.
Figure 2:
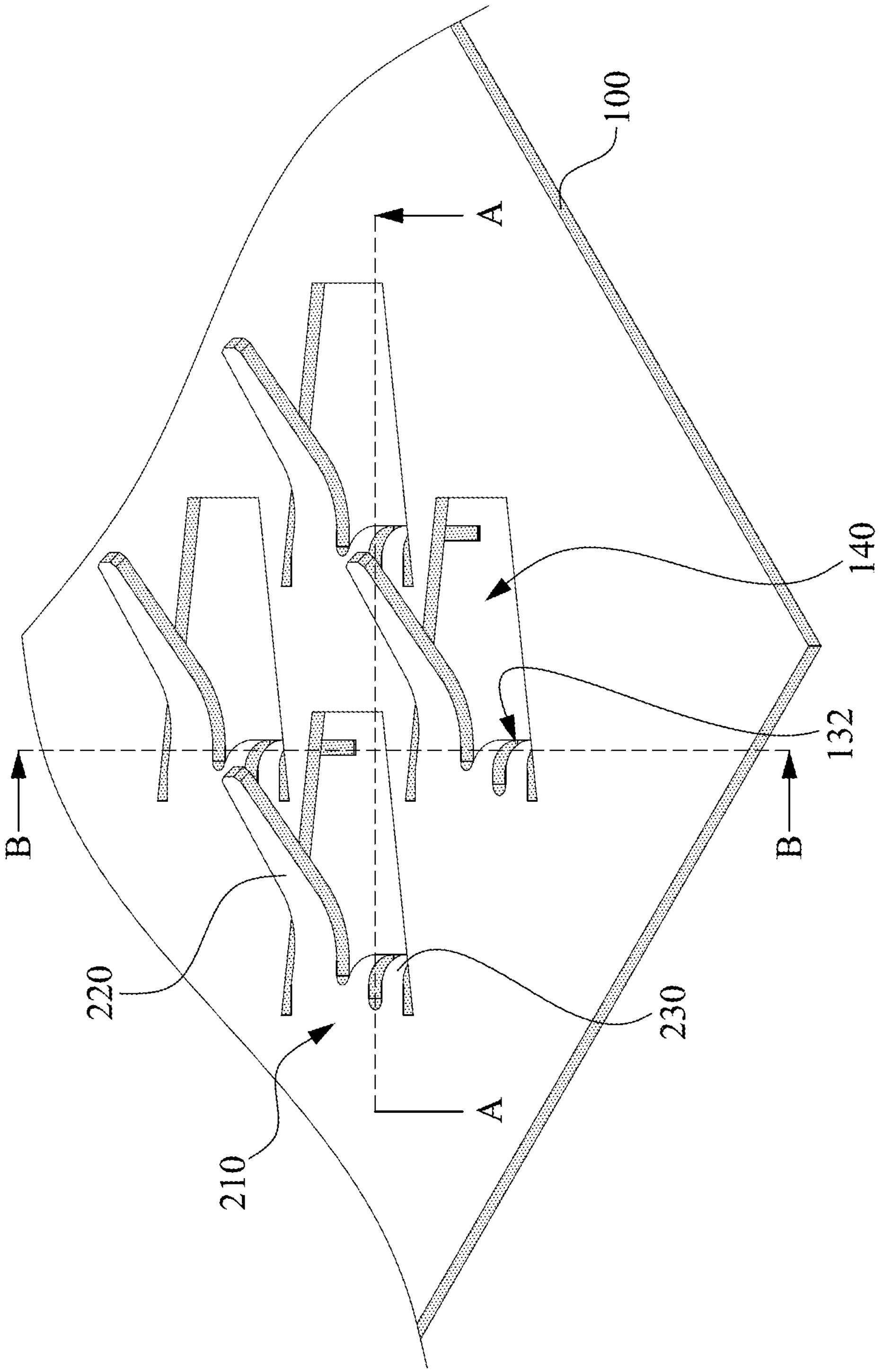
Figure 3A:
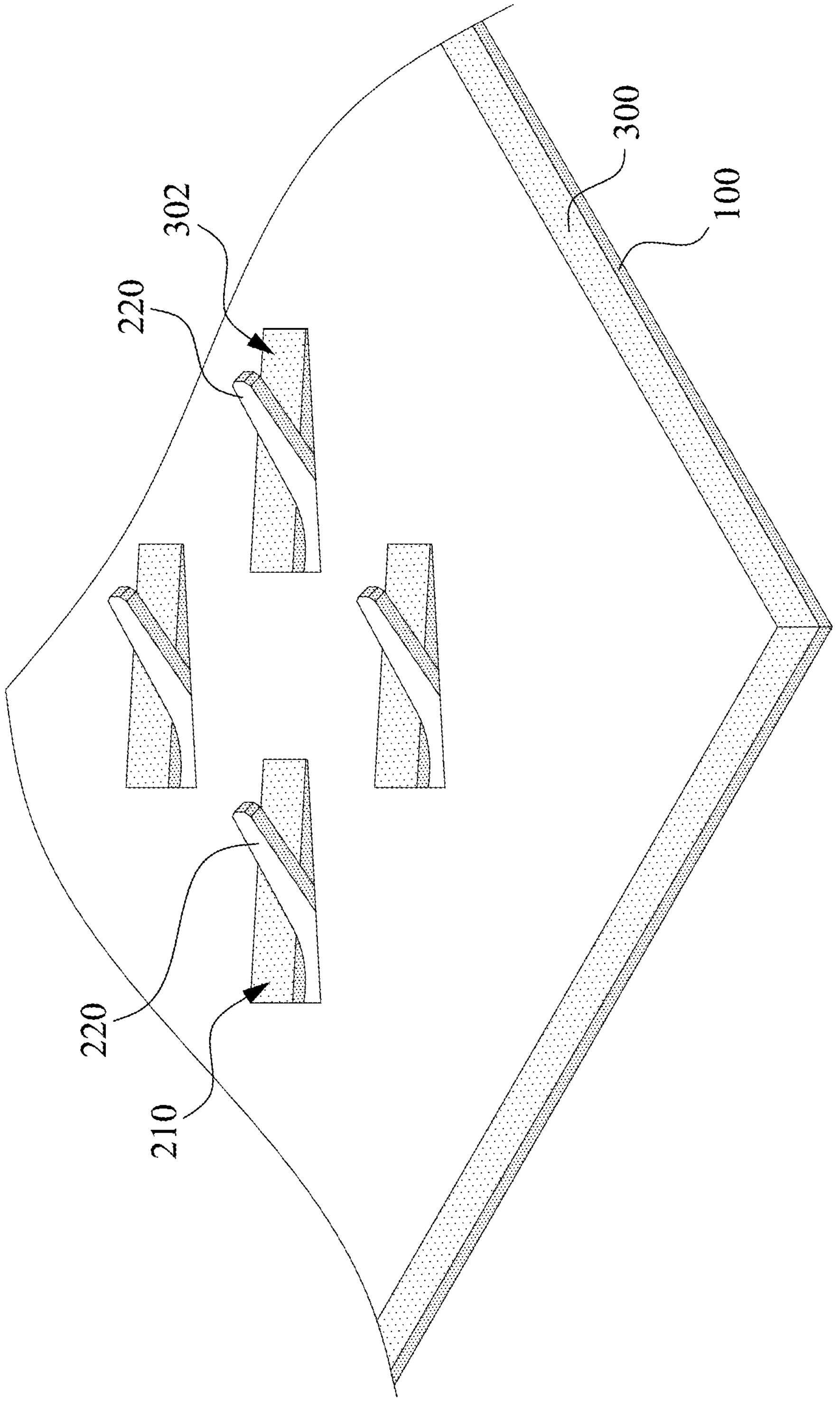
Figure 3B:
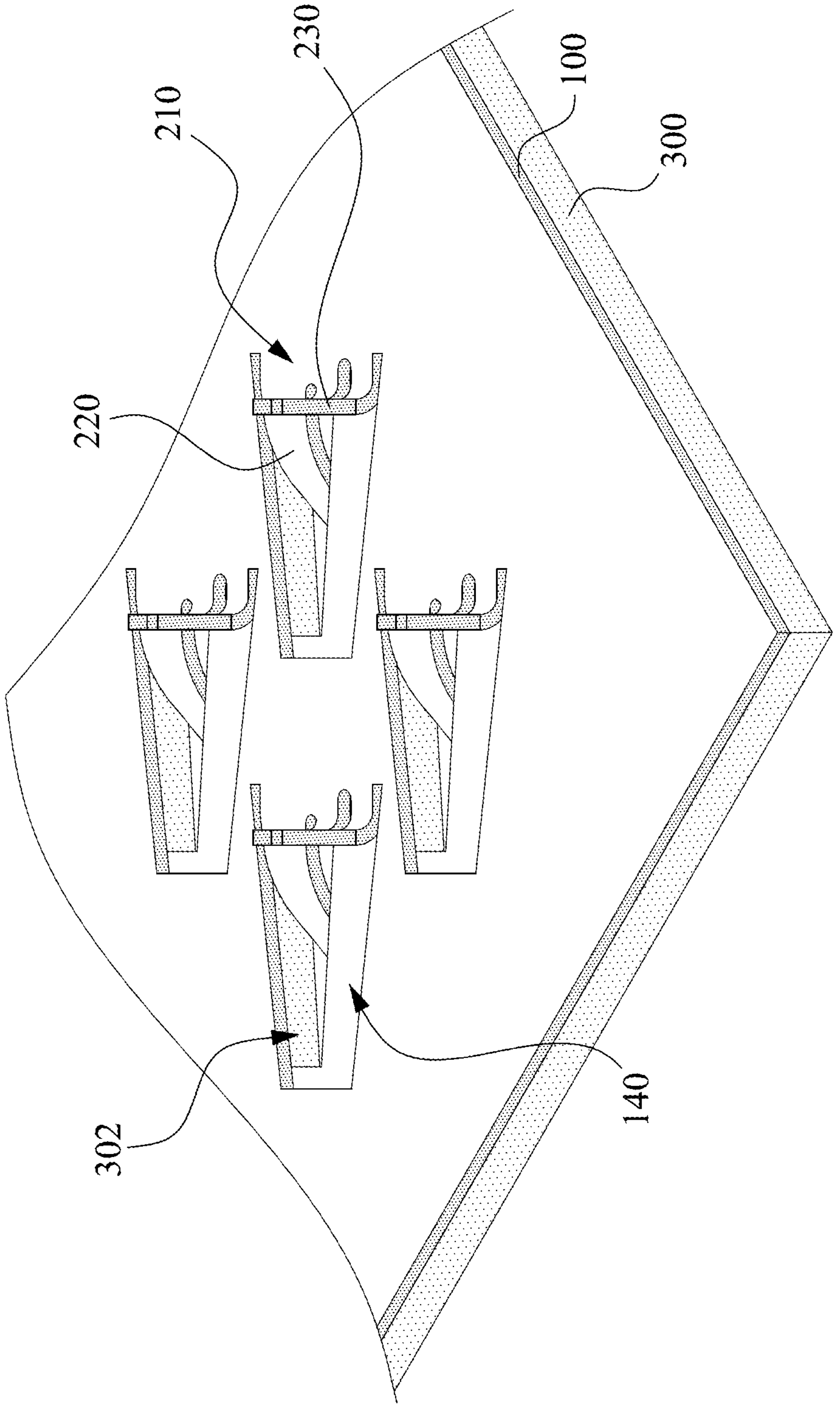
Figure 3C:
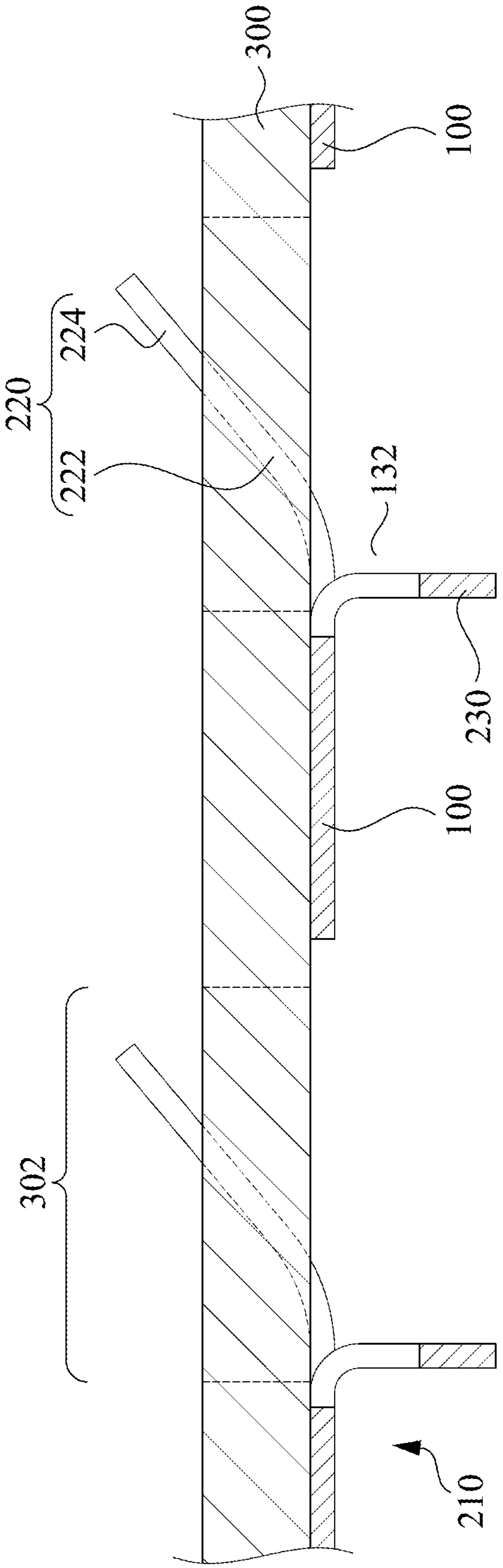
Figure 4A:
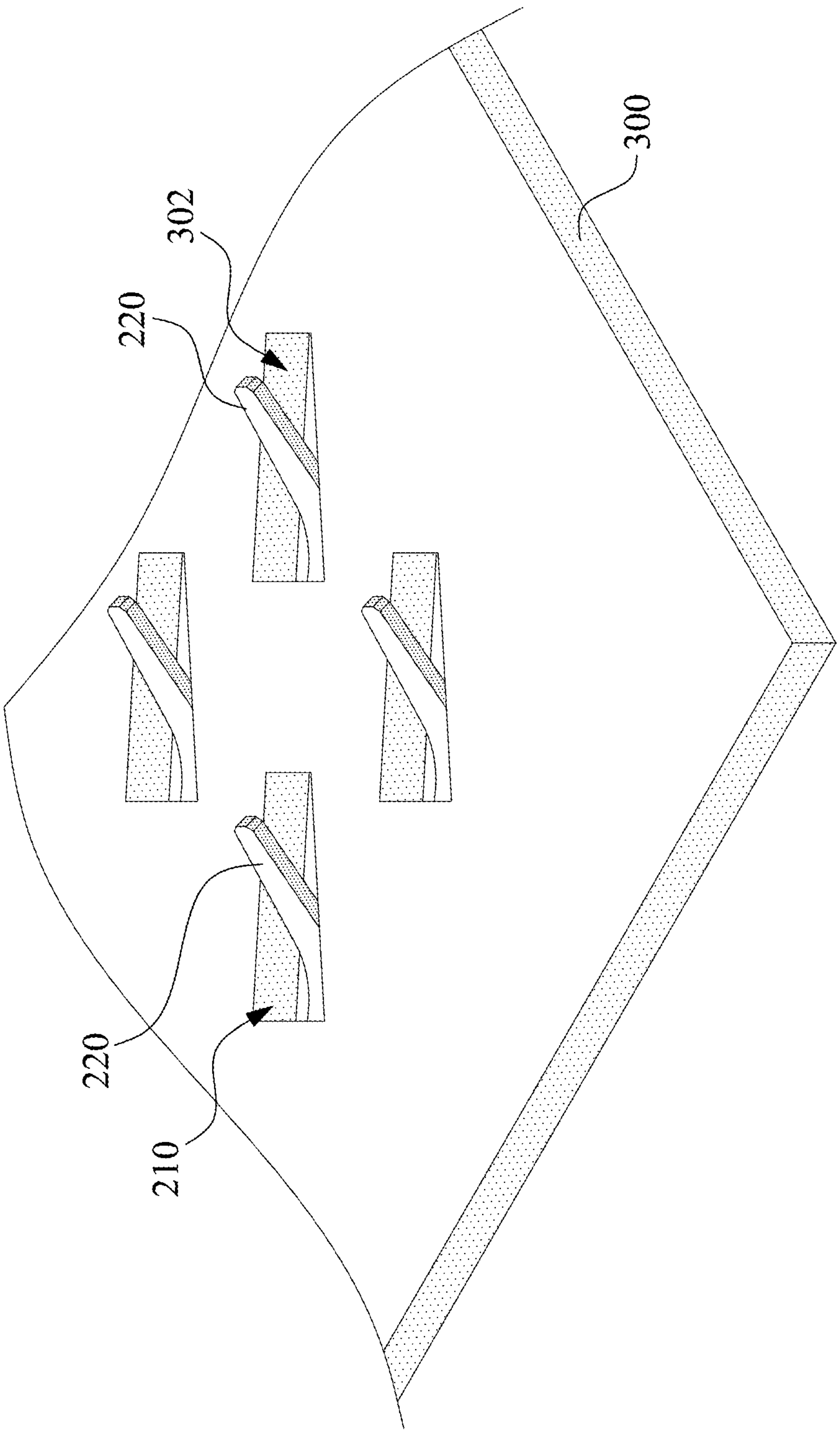
Figure 4B:
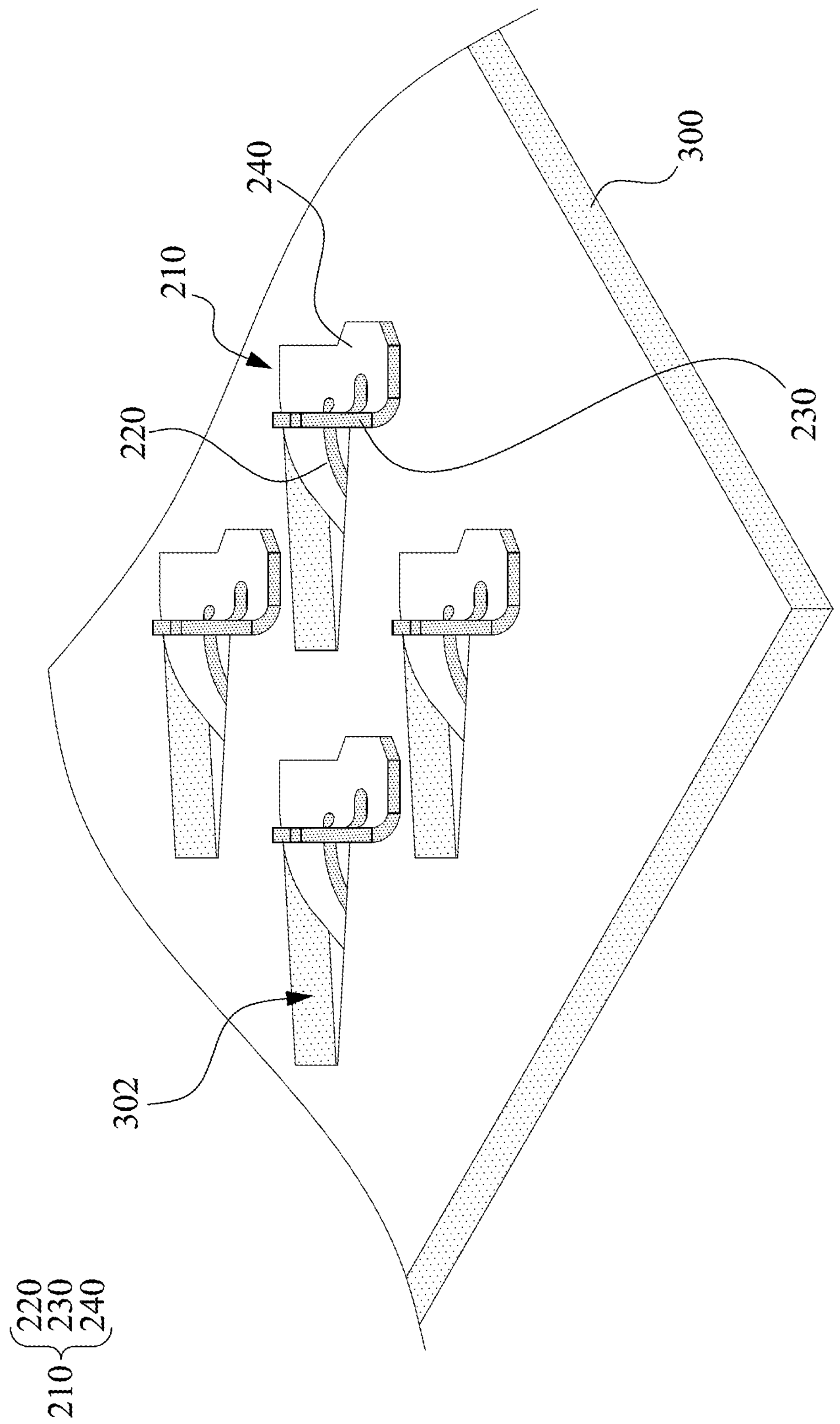
Figure 4C:
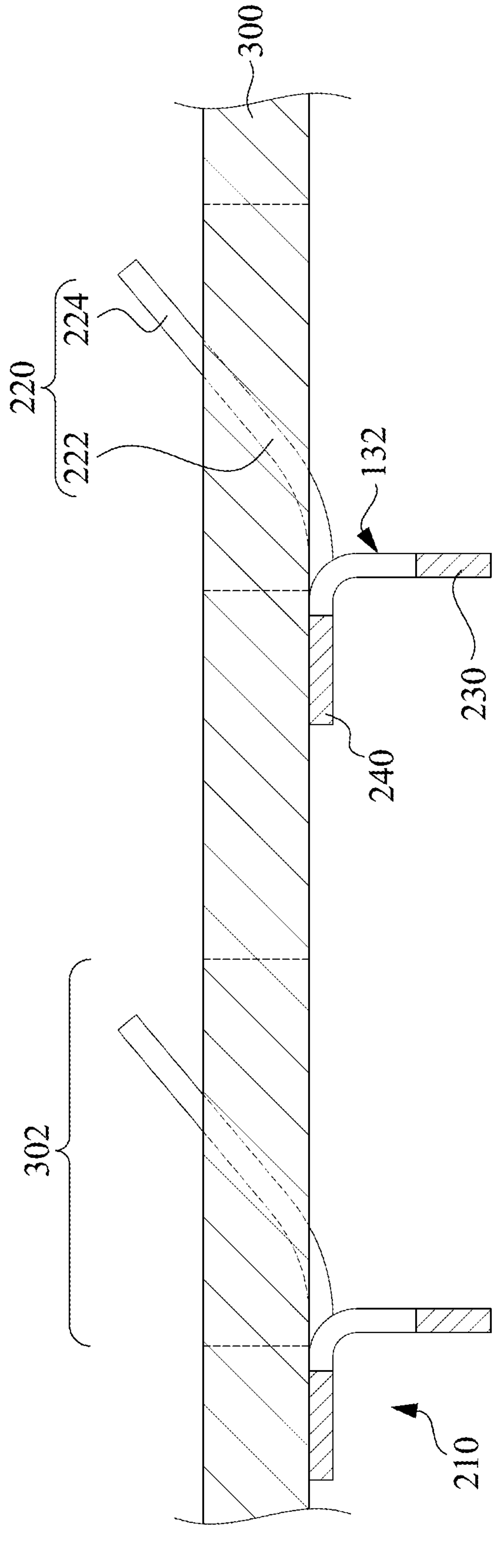
Figure 4D:
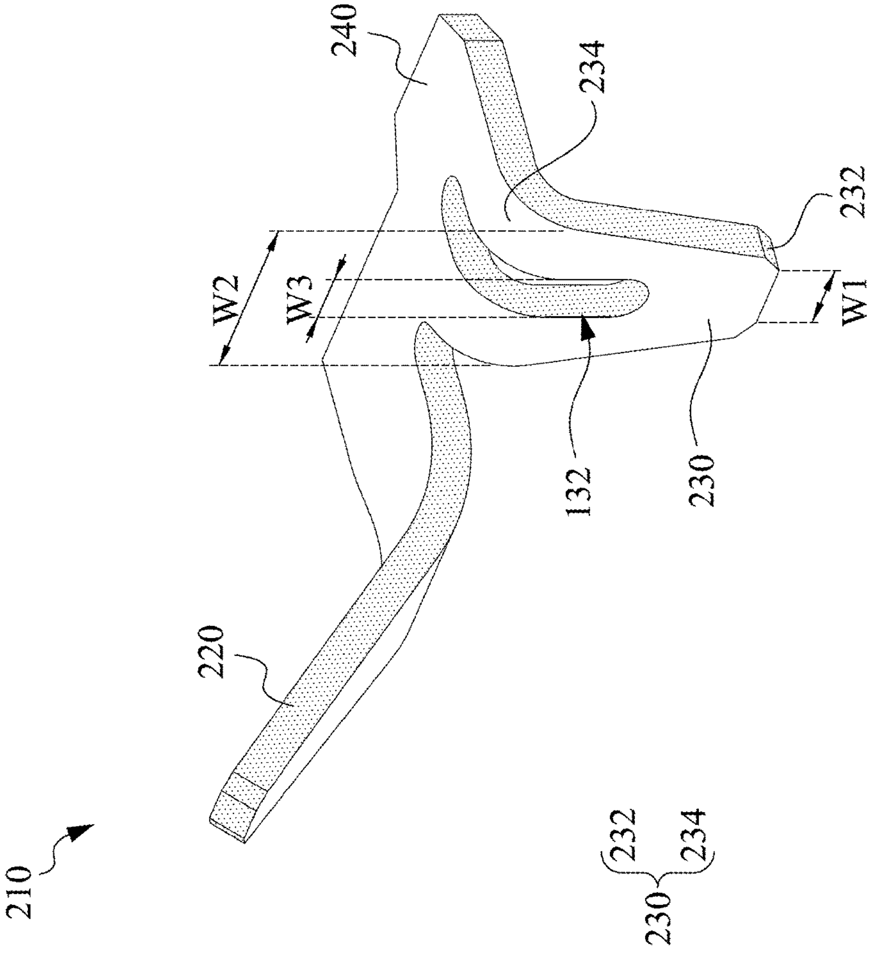

FIG. 1, FIG. 2, FIG. 3A, FIG. 3B, FIG. 3C, FIG. 4A, FIG. 4B, FIG. 4C and FIG. 4D are views at various stages of a method for manufacturing a spring contact according to some embodiments of the present disclosure. FIG. 1, FIG. 2, FIG. 3A and FIG. 4A are schematic perspective views according to some embodiments of the present disclosure. FIG. 3B and FIG. 4B are schematic perspective views of FIG. 3A and FIG. 4A from another observation angle according to some embodiments of the present disclosure. FIG. 3C and FIG. 4C are cross-sectional views of FIG. 3A and FIG. 4A according to some embodiments of the present disclosure. FIG. 4D is a schematic perspective view of the single spring contact according to some embodiments of the present disclosure.

Unless otherwise illustrated, the order in which some or all of the operations are described should not be construed to imply that these operations are necessarily order dependent. Alternative ordering will be appreciated and have the benefit of this description. Additional operations can be provided before, during, and/or after these operations to completely form a spring contact, and may be briefly described herein. Further, it will be understood that not all operations are necessarily present in each embodiment provided herein. Also, it will be understood that not all operations are necessary in some embodiments.

Referring to FIG. 1, FIG. 1 illustrates an operation of providing a metal foil 100. A material of the metal foil 100 can include gold (Au), silver (Ag), copper (Cu), nickel (Ni), tin (Sn), other suitable metal, an alloy of aforementioned material or a combination thereof. In some embodiments, the metal foil 100 can be a copper foil.

FIG. 1 illustrates a subsequent operation of patterning the metal foil 100 to form multiple planar spring contacts 110 each of which is connected to each other. Each of the planar spring contacts 110 includes a rising portion 120 and a pin portion 130. In some embodiments, the rising portion 120 and the pin portion 130 are coplanar with each other. The pin portion 130 may include a hollow portion 132. For example, the hollow portion 132 shown in FIG. 1 can be an opening penetrating through the pin portion 130. In later process of inserting a spring contact into a conductive through hole, the hollow portion 132 can provide a later-formed spring contact with a flexible room for volume change (i.e., a press-fit room). For the purpose of clarity, in the schematic perspective view shown in FIG. 1, sides of the metal foil 100 and the derivative thereof are indicated with a pattern fill. In the following schematic perspective views as shown in FIG. 2, FIG. 3A, FIG. 3B, FIG. 4A, FIG. 4B, FIG. 4D, FIG. 5 and FIG. 6A are in the same way.

A method for patterning the metal foil 100 to form the planar spring contacts 110 can include a machining process (e.g., punching), a laser process, an etching process (e.g., a wet etching process), other suitable processes or a combination thereof. In some embodiments where a wet etching process is implemented, a method for patterning the metal foil 100 can further include disposing a photoresist (not shown herein) on the metal foil 100, forming a photoresist pattern, and etching the metal foil 100 through the photoresist pattern.

In order to increase the yield of the later-formed spring contact, a hollow area 140 can be formed in proximity to the rising portion 120 and the pin portion 130. The hollow area 140 can space apart the rising portion 120 and the pin portion 130 from the metal foil 100, and therefore a risk of damage due to the rising portion 120 and the pin portion 130 touching the metal foil 100 in a subsequent process of punching (e.g., an operation illustrated in FIG. 2) can be reduced.

Referring to FIG. 2, FIG. 2 illustrates an operation of punching the planar spring contacts 110 (referring to FIG. 1) to form three-dimensional spring contacts 210. Particularly, the rising portion 120 and the pin portion 130 of each planar spring contacts 110 are respectively bent to different directions to form the three-dimensional spring contacts 210. In some embodiments, the bent rising portion 120 becomes a rising member 220. In some embodiments, the bent pin portion 130 becomes a pin 230. After bending, the rising member 220 and the pin 230 may not be coplanar with each other. In some embodiments, an angle between the pin 230 and the metal foil 100 is between about 85 degrees and about 95 degrees, for example, about 90 degrees.

Referring to FIG. 3A, FIG. 3A illustrates an operation of attaching the metal foil 100 to a coverlay 300. Specifically, the coverlay 300 can include an opening 302. A portion of the rising member 220 can be seen from the observation angle of FIG. 3A since the rising member 220 is inserted through the opening 302. On the other hands, the pin 230 and the rest of the metal foil 100 cannot be seen from the current observation angle of FIG. 3A due to the coverlay 300. Similarly, for the purpose of clarity, in the schematic perspective view shown in FIG. 3A, sides related to the coverlay 300 are indicated with another pattern fill. In the following schematic perspective views as shown in FIG. 3B, FIG. 4A, FIG. 4B, FIG. 4D, FIG. 5 and FIG. 6A are in the same way.

The metal foil 100 can be attached to the coverlay 300 by a bonding process. A material of the coverlay 300 can include polyimide (PI), polyethylene terephthalate (PET), polyurethane (PU), polyethylene (PE), polyvinyl chloride polymer (PVC, other suitable material or a combination thereof.

Referring to FIG. 3B, FIG. 3B is a schematic perspective view of FIG. 3A from another observation angle according to some embodiments of the present disclosure. For example, the structure of FIG. 3B is the inverted structure of FIG. 3A. In FIG. 3B, the pin 230 can be seen. In some embodiments, the opening 302 of the coverlay 300 is smaller than the hollow area 140 of the metal foil 100.

Referring to FIG. 3C, FIG. 3C is a cross-sectional view of FIG. 3A with a reference cross section taking along line A-A shown in FIG. 2 according to some embodiments of the present disclosure. For the purpose of clarity, the cut sections of the metal foil 100 and the spring contact 210 are indicated with one type of pattern fill, and the cut section of the coverlay 300 is indicated with another type of pattern fill. The un-cut sections are indicated without any pattern fill. In the following cross-sectional views as shown in FIG. 4C, FIG. 6B and FIG. 6C are in the same way.

The rising member 220 can extend through the opening 302, and therefore the rising member 220 can be positioned at two opposite sides of the coverlay 300. That is, an extent of the rising member 220 can be larger than a thickness of the coverlay 300 and distribute at an upper side and a lower side of the coverlay 300. A first portion 222 of the rising member 220 is in the opening 302 of the coverlay 300, and a second portion 224 of the rising member 220 is out of the opening 302 of the coverlay 300. In other words, the second portion 224 of the rising member 220 is above the opening 302 and protrudes from one side of the coverlay 300, for example, the upper side of the coverlay 300 as shown in FIG. 3C.

Referring to FIG. 4A, FIG. 4B and FIG. 4C, FIG. 4A, FIG. 4B and FIG. 4C illustrate an operation of patterning the metal foil 100 to separate each of the spring contacts 210. During patterning, the spring contacts 210 are still attached to the coverlay 300. The structure of FIG. 4A is similar to the structure of FIG. 3A, and the only difference is that the metal foil 100 seen in FIG. 3A and FIG. 3B is removed after patterning. It is clear from the observation angle of FIG. 4B that each of the spring contacts 210 is spaced apart from each other and an anchor member 240 is formed after patterning. Thus, the rising member 220 can extend from the anchor member 240 and through the opening 302, and the pin 230 can extend from the anchor member 240 in a direction away from the opening 302.

In FIG. 4C, the anchor member 240 is connected to the coverlay 300 by contact (e.g., direct contact) such that the spring contacts 210 can remain attached to the coverlay 300. In some embodiments, the spring contact 210 formed from the metal foil 100 may be in an array arrangement. With the attachment to the coverlay 300, each individual the spring contact 210 can be kept in the original array arrangement after patterning the metal foil 100 to separate each of the spring contacts 210.

A method for patterning the metal foil 100 to separate the spring contact 210 can include a machining process (e.g., punching), a laser process, an etching process (e.g., a wet etching process), other suitable processes or a combination thereof. In some embodiments where a wet etching process is implemented, a method for patterning the metal foil 100 can further include disposing a photoresist (not shown herein) on the metal foil 100, forming a photoresist pattern, and etching the metal foil 100 through the photoresist pattern.

Referring to FIG. 4D, FIG. 4D further illustrates the structure and profile of the single spring contact 210 according to some embodiments of the present disclosure. For the purpose of clarity, the coverlay 300 is omitted in FIG. 4D to clearly show the spring contact 210. The spring contact 210 may include the rising member 220, the pin 230 and the anchor member 240. The pin 230 may include a rear end 232 positioned away from the anchor member 240. The pin 230 may also include a connective end 234 connected to the anchor member 240 and positioned opposite the rear end 232. A first width W1 of the rear end 232 may be smaller than a second width W2 of the connective end 234. In some embodiments, a width of the pin 230 is gradually increased from the rear end 232 to the connective end 234. In other words, a width of the pin 230 between the rear end 232 and the connective end 234 can be the same as or smaller than the second width W2.

Referring to FIG. 4D and FIG. 6C, in the subsequent process, since the pin 230 can be inserted into a substrate 400 and a conductive through hole 402 to form a connector 600, a width of the pin 230 and a diameter D of the conductive through hole 402 can fit each other. The first width W1 of the pin 230 may be designed to be smaller than the diameter D of the conductive through hole 402 to ensure that the pin 230 can inserted into the conductive through hole 402. The second width W2 of the pin 230 may be designed to be larger than the diameter D of the conductive through hole 402 to ensure that the pin 230 can directly contact an inner wall of the conductive through hole 402 after the pin 230 is inserted into the conductive through hole 402. In other words, the diameter D of the conductive through hole 402 may be between the first width W1 and the second width W2.

In some embodiments, a ratio of the second width W2 to the diameter D of the conductive through hole 402 is between about 1.1 and about 1.3, for example, 1.1, 1.2, or 1.3. If the ratio of the second width W2 to the diameter D of the conductive through hole 402 is below the above-noted lower limit, the pin 230 cannot abut the inner wall of the conductive through hole 402, increasing a possibility of poor electrical connection between the pin 230 and the conductive through hole 402. If the ratio of the second width W2 to the diameter D of the conductive through hole 402 is beyond the above-noted upper limit, the pin 230 cannot entirely be inserted into the conductive through hole 402, and therefore the spring contact 210 may protrude from a surface of the substrate 400, causing a connector with an enlarged thickness or undesirable structure of a connector. In addition, the pin 230 and the conductive through hole 402 can be designed as interference fit to each other.

The pin 230 may include the hollow portion 132 formed therein. Further, the hollow portion 132 can extend from the connective end 234 to the rear end 232. The hollow portion 132 has a third width W3 smaller than the second width W2.

As discussed previously, a width of a portion of the pin 230 may be designed to be larger than the diameter D of the conductive through hole 402. Therefore, during a process of inserting the pin 230 into the conductive through hole 402 of the substrate 400, the pin 230 may be slightly deformed by the press of the inner wall of the conductive through hole 402 (e.g., a width of the pin 230 may be squeezed and reduced). Then, the hollow portion 132 can provide the pin 230 with a flexible room for deformation (e.g., press-fit room). In some embodiments, a ratio of the third width W3 to the second width W2 is between about 0.25 and about 0.50, for example 0.25, 0.30, 0.35, 0.40, 0.45 and 0.50.

If the ratio of the third width W3 to the second width W2 is below the above-noted lower limit, the hollow portion 132 cannot provide the pin 230 with enough flexible room (i.e., press-fit room) and therefore the pin 230 cannot entirely be inserted into the conductive through hole 402. As a result, the spring contact 210 may protrude from a surface of the substrate 400, causing a connector with an enlarged thickness or undesirable structure of a connector. If the ratio of the third width W3 to the second width W2 is beyond the above-noted upper limit, although the hollow portion 132 can provide the pin 230 with enough flexible room, yet the pin 230 the pin 230 may not abut the inner wall of the conductive through hole 402, increasing a possibility of poor electrical connection between the pin 230 and the conductive through hole 402.

Then, the spring contact 210 including the rising member 220, the pin 230 and the anchor member 240 is basically complete. Moreover, the spring contacts 210 are still attached to the coverlay 300 and arranged in a predetermined array. The coverlay 300 can help the spring contact 210 remain in the predetermined array.

Figure 5:
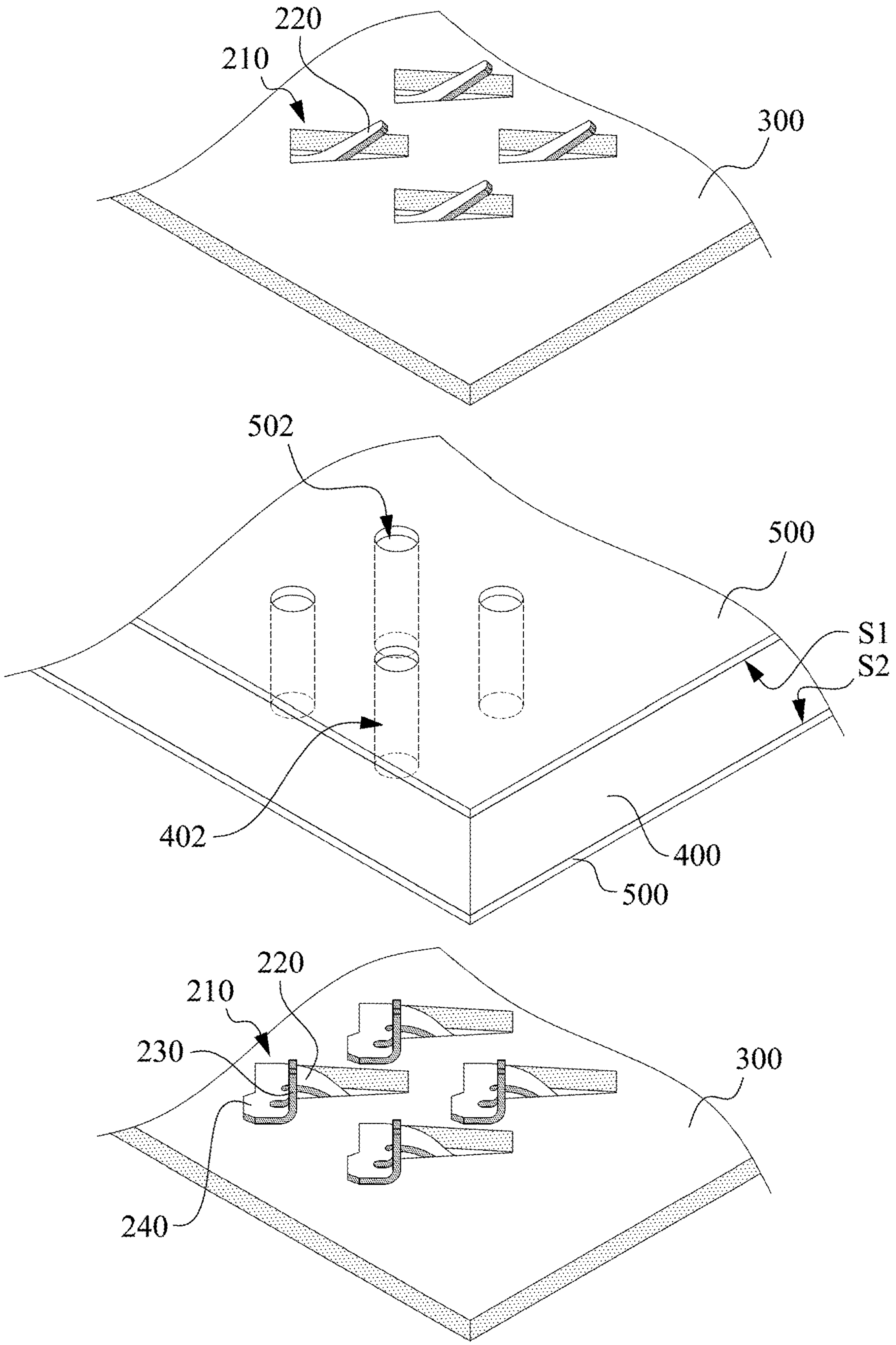
FIG. 5, FIG. 6A, FIG. 6B and FIG. 6C are views at various stages of a method for manufacturing a connector according to some embodiments of the present disclosure.
Figure 6A:
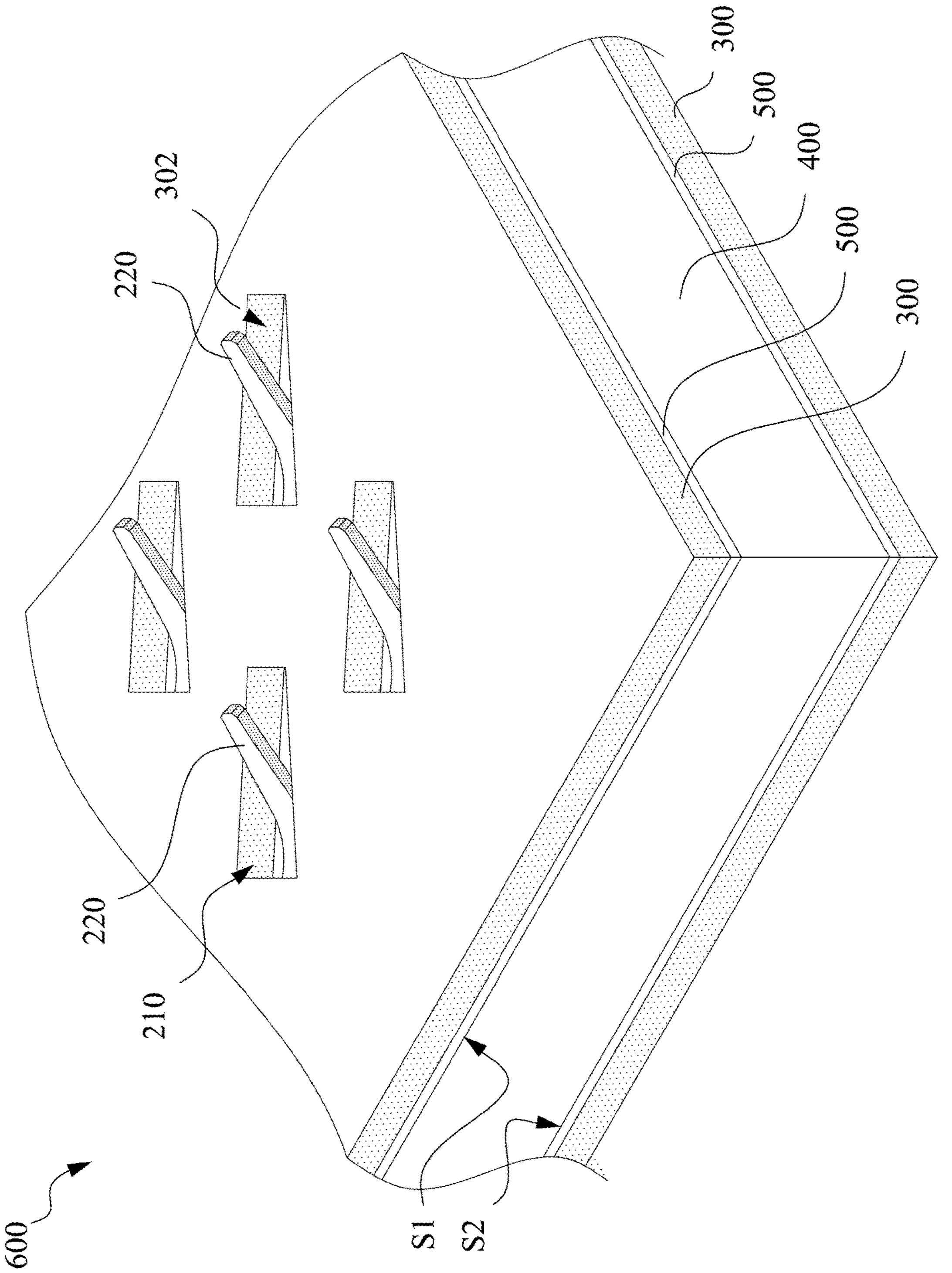
Figure 6B:
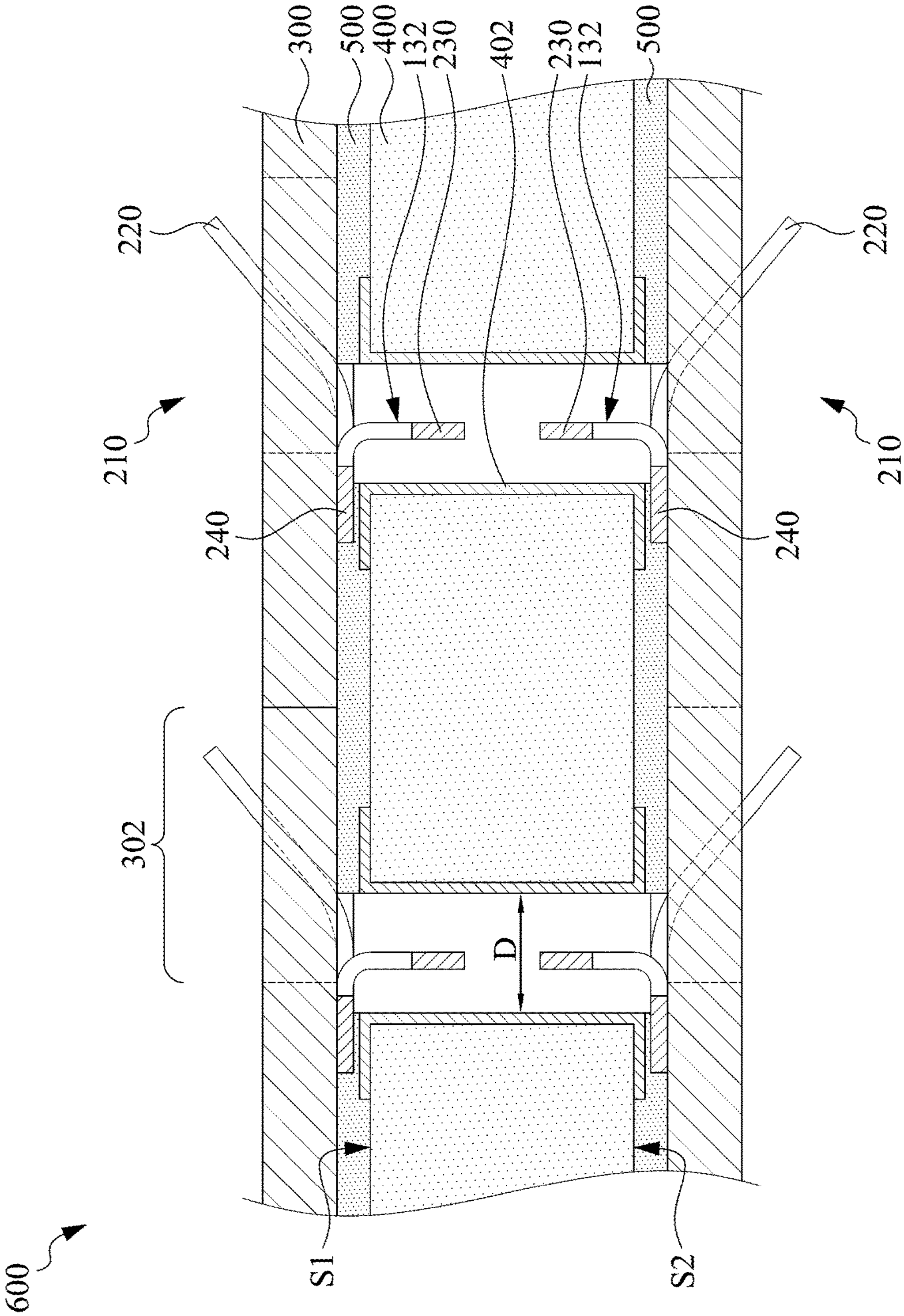
Figure 6C:
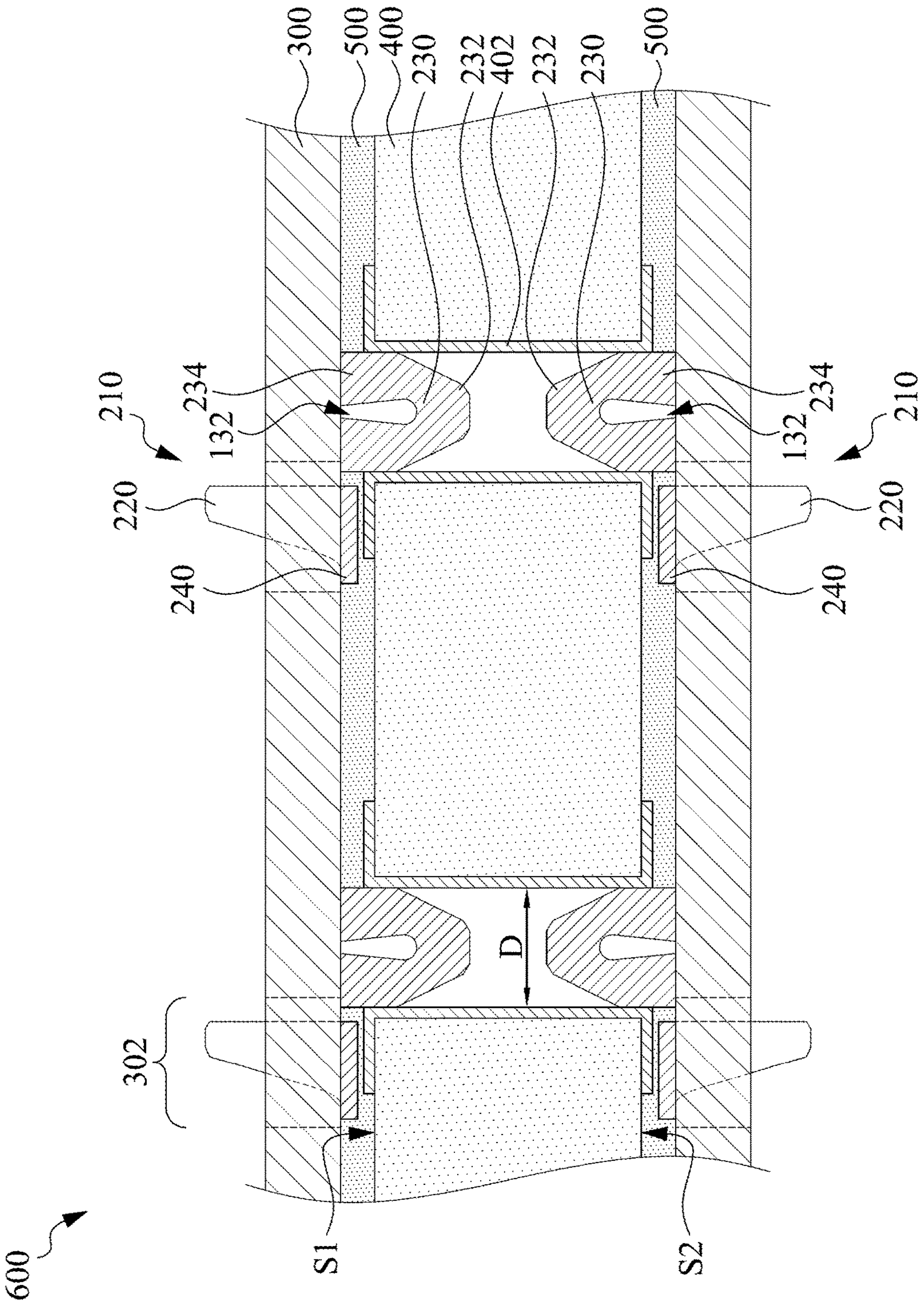

FIG. 5, FIG. 6A, FIG. 6B and FIG. 6C are views at various stages of a method for manufacturing a connector according to some embodiments of the present disclosure. FIG. 5 and FIG. 6A are schematic perspective views according to some embodiments of the present disclosure. FIG. 6B is a cross-sectional view of FIG. 6A with a reference cross section taking along line A-A shown in FIG. 2 according to some embodiments of the present disclosure. FIG. 6C is a cross-sectional view of FIG. 6A with a reference cross section taking along line B-B shown in FIG. 2 according to some embodiments of the present disclosure.

Unless otherwise illustrated, the order in which some or all of the operations are described should not be construed to imply that these operations are necessarily order dependent. Alternative ordering will be appreciated and have the benefit of this description. Additional operations can be provided before, during, and/or after these operations to completely form a connector, and may be briefly described herein. Further, it will be understood that not all operations are necessarily present in each embodiment provided herein. Also, it will be understood that not all operations are necessary in some embodiments.

Referring to FIG. 5, FIG. 5 illustrates an operation of providing the substrate 400 having a first surface S1, a second surface S2 opposite to the first surface S1, and the conductive through hole 402 extending between the first surface S1 and the second surface S2. Further, FIG. 5 illustrates an operation of providing the coverlay 300 and the spring contacts 210 attached to the coverlay 300. The pin 230 of each of the spring contacts 210 is directed to and aligned with the corresponding conductive through hole 402. It is noted that, for the purpose of clarity, the conductive through hole 402 in FIG. 5 has been simplified, and only the positions of the conductive through hole 402 are shown in the substrate 400.

In some embodiments, an adhesive layer 500 can be disposed on the first surface S1 and the second surface S2 of the substrate 400 to bond the coverlay 300 and the spring contact 210 on the substrate 400. The adhesive layer 500 may include an opening 502 whose position corresponds to the position of the conductive through hole 402. For example, the opening 502 is right on the conductive through hole 402, such that the inner wall of the conductive through hole 402 may be exposed in the opening 502. In some embodiments, a width of the opening 502 may be the same as or larger than the diameter D of the conductive through hole 402, facilitating a subsequent process (e.g., the processes described in the following FIG. 6A to FIG. 6C) of inserting the pin 230 into the conductive through hole 402 through the opening 502. A material of the adhesive layer 500 can include epoxy, silicon, other suitable material or a combination thereof.

Referring to FIG. 6A, FIG. 6B and FIG. 6C, FIG. 6A, FIG. 6B and FIG. 6C illustrates an operation of disposing the coverlay 300 and the spring contacts 210 attached to the coverlay 300 onto the first surface S1 and the second surface S2 of the substrate 400, and inserting the pin 230 into the conductive through hole 402. Particularly, two pin 230 are inserted into the same conductive through hole 402 respectively from the first surface S1 and the second surface S2, as shown in FIG. 6B and FIG. 6C. Since the pin 230 is designed to directly contact the inner wall of the conductive through hole 402, after inserting the pin 230 into the conductive through hole 402, the pin 230 can be electrically connected to the conductive through hole 402 due to the direct contact.

Then, the connector 600 can be formed by the above-described operations. Two spring contacts 210 inserted into the same conductive through hole 402 can be electrically connected to each other by the conductive through hole 402. It is noted that, before the spring contacts 210 and the substrate 400 are assembled together, the spring contacts 210 are spaced apart from each other and remain in the predetermined array due to an attachment of the coverlay 300. Subsequently, each individual spring contact 210 and the substrate 400 assembled together in a mechanical way (e.g., inserting the pin 230 of the spring contact 210 into the conductive through hole 402 of the substrate 400), thereby simplifying the manufacturing operations.

In some embodiments, the coverlay 300 and multiple the spring contacts 210 can be disposed on the first surface S1 and the second surface S2 in sequence. For example, the coverlay 300 and the spring contacts 210 can firstly be disposed on the first surface S1, and then the other coverlay 300 and the other the spring contacts 210 can be disposed on the second surface S2. In some other embodiments, the coverlay 300 and the spring contacts 210 can be disposed on the first surface S1 and the second surface S2 at the same time. In some embodiments, a method of disposing the coverlay 300 and the spring contact 210 on the substrate can include a bonding process, thereby connecting the coverlay 300 and the spring contact 210 to the substrate 400.

As described previously, with the attachment to the coverlay 300, each individual the spring contact 210 can be kept in the predetermined arrangement. The arrangement of the spring contacts 210 attached to the coverlay 300 can be designed to correspond to the arrangement of the conductive through holes 402. Thus, in the case of using the coverlay 300, the spring contacts 210 can be inserted into the corresponding conductive through holes 402 at the same time, thereby enhancing the manufacturing throughput. Further, each the spring contact 210 can be electrically isolated from each other by the coverlay 300, as shown in FIG. 6A.

In some embodiments where the adhesive layer 500 is used, the adhesive layer 500 can bond the coverlay 300 and the spring contact 210 on the substrate 400, thereby increasing the reliability of the connector 600.

In the cross-sectional views shown in FIG. 6B and FIG. 6C, the conductive through hole 402 extends to the first surface S1 and the second surface S2, and has the diameter D. It is noted that, FIG. 5 illustrates a simplified view of the conductive through holes 402 to clear show the positions of the conductive through holes 402 in the substrate 400. As a result, the conductive through hole 402 shown in FIG. 5 may be different from the conductive through hole 402 shown in FIG. 6B and FIG. 6C, but those skilled in the art can still understand the aspect of the present disclosure.

The anchor member 240 of the spring contact 210 can be between the substrate 400 and the coverlay 300. In some embodiments where the adhesive layer 500 is used, the adhesive layer 500 can be disposed between the anchor member 240 and the substrate 400, and directly contact the anchor member 240 and the substrate 400 to bond the anchor member 240 onto the substrate 400. The rising member 220 extends through the opening 302 in a direction away from the substrate 400 and out of the coverlay 300. In some embodiments, the adhesive layer 500 can be exposed in the opening 302. The pin 230 extends from the anchor member 240 to an inside of the conductive through hole 402. Consequently, the hollow portion 132 of the pin 230 can be inside the conductive through hole 402.

As described previously, a width of the rear end 232 of the pin 230 (e.g., the first width W1 shown in FIG. 4D) is less than the diameter D of the conductive through hole 402, and a width of the connective end 234 of the pin 230 (the second width W2 shown in FIG. 4D) is greater than the diameter D of the conductive through hole 402. In addition, a width of the pin 230 can be gradually increased from the rear end 232 to the connective end 234. During a process of inserting the pin 230 into the conductive through hole 402, the pin 230 may be kept moving into the conductive through hole 402 until the pin 230 presses against the inner wall of the conductive through hole 402. In some embodiments, the pin 230 may rub along the inner wall of the conductive through hole 402 as well as move toward the inside of the conductive through hole. Therefore, the pin 230 can strongly and directly contact the inner wall of the conductive through hole 402, thereby enhancing the electrical connection between the pin 230 and the conductive through hole 402.

Due to the fact that a width of a portion of the pin 230 (e.g., the pin 230 near the connective end 234) may be greater than the diameter D of the conductive through hole 402, when the pin 230 is inserted into the conductive through hole 402, in some embodiments, the pin 230 may be deformed by, for example, the press of the inner wall of the conductive through hole 402, and a width of the pin 230 may be squeezed to fit the dimension of the conductive through hole 402. Then, the hollow portion 132 may accordingly be deformed to provide the pin 230 with a flexible room for shape change.

The connector 600 can be formed according to the above-described processes. Two spring contacts 210 inserted into the same conductive through hole 402 can be electrically connected to each other by the conductive through hole 402 in directly contact with the two spring contact 210. Compared to the conventional process such as the electroplating process or the seed layer formation process implemented to electrically connect two spring contacts at two separate sides of the conductive through hole, various embodiments of the present disclosure provide a simplified method for manufacturing the connector 600, thereby reducing the cost and enhancing the yield of the connector.

The present disclosure discloses various embodiments to provide a connector and a method for manufacturing the same. A spring contact of the connector is designed to include a pin. Firstly, multiple spring contacts are formed on and attached to a coverlay in an array arrangement. Then, the pin of each of the spring contacts is inserted into a conductive through hole such that the spring contact is electrically connected to the conductive through hole by making the pin directly contact the conductive through hole. Thus, the method for manufacturing the connector can be simplified, thereby reducing the cost and enhancing the yield of the connector.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A connector, comprising:

a substrate having a first surface, a second surface opposite to the first surface, and a conductive through hole extending between the first surface and the second surface;

a coverlay, disposed on the first surface and including a first opening; and a spring contact, including:

an anchor member, disposed between the substrate and the coverlay;

a rising member, extending from the anchor member and through the first opening in a direction away from the substrate, wherein a first portion of the rising member is in the first opening, and a second portion of the rising member is out of the first opening; and a pin, extending from the anchor member to an inside of the conductive through hole, and electrically connected to the conductive through hole, wherein the pin comprises a rear end with a first width positioned inside the conductive through hole and a connective end with a second width positioned opposite the rear end and connected to the anchor member, and a width of the pin between the rear end and the connective end is not larger than the second width.

2. The connector of claim 1, wherein the pin directly contacts an inner wall of the conductive through hole.

3. The connector of claim 1, wherein the first width is less than a diameter of the conductive through hole; and the second width is larger than the diameter of the conductive through hole.

4. The connector of claim 3, wherein the width of the pin is gradually increased from the rear end to the connective end.

5. The connector of claim 3, wherein a ratio of the second width to the diameter of the conductive through hole is between 1.1 and 1.3.

6. The connector of claim 3, wherein the pin includes a hollow portion extending from the connective end to the rear end.

7. The connector of claim 6, wherein the hollow portion has a third width, and a ratio of the third width to the second width is between 0.25 and 0.50.

8. The connector of claim 1, further comprising:

an adhesive layer, disposed between the anchor member and the substrate, and including a second opening formed above the conductive through hole, wherein a width of the second opening is the same as or larger than a diameter of the conductive through hole such that the pin is inserted into the conductive through hole through the second opening.

9. The connector of claim 8, wherein the adhesive layer is exposed in the first opening.

10. A method for manufacturing a connector, comprising:

providing a substrate, wherein the substrate has a first surface, a second surface opposite to the first surface, and a conductive through hole extending between the first surface and the second surface;

providing a first coverlay and a plurality of first spring contacts attached to the first coverlay, wherein the first coverlay includes a first opening and each of the plurality of first spring contacts includes:

an anchor member, connected to the first coverlay;

a rising member, extending from the anchor member and through the first opening, wherein a portion of the rising member is above the first opening; and a pin, extending from the anchor member in a direction away from the first opening, wherein the pin comprises a rear end with a first width and a connective end with a second width, the connective end is positioned opposite the rear end and connected to the anchor member, and a width of the pin between the rear end and the connective end is not larger than the second width;

disposing the first coverlay and the plurality of first spring contacts attached to the first coverlay onto the first surface of the substrate, wherein the anchor member is between the substrate and the first coverlay;

inserting the pin into the conductive through hole, wherein the rear end is positioned inside the conductive through hole; and electrically connecting the pin and the conductive through hole.

11. The method for manufacturing the connector of claim 10, wherein electrically connecting the pin and the conductive through hole comprises making the pin directly contact the conductive through hole.

12. The method for manufacturing the connector of claim 10, wherein a method for manufacturing the plurality of first spring contacts attached to the first coverlay comprises:

providing a metal foil;

patterning the metal foil to form a plurality of planar spring contacts, wherein each of the plurality of planar spring contacts is connected to each other and includes a rising portion and a pin portion;

punching the plurality of planar spring contacts such that the rising portion and the pin portion of each of the plurality of planar spring contacts are respectively bent to different directions to form the plurality of first spring contacts, wherein the rising portion becomes the rising member, and the pin portion becomes the pin;

attaching the metal foil to the first coverlay, wherein the rising member is inserted through the first opening of the first coverlay and a portion of the rising member is above the first opening; and patterning the metal foil to separate the plurality of first spring contacts, wherein the plurality of first spring contacts are still attached to the first coverlay.

13. The method for manufacturing the connector of claim 12, wherein patterning the metal foil to form the plurality of planar spring contacts comprises forming a hollow portion in the pin portion.

14. The method for manufacturing the connector of claim 13, wherein after inserting the pin into the conductive through hole, the hollow portion is inside the conductive through hole.

15. The method for manufacturing the connector of claim 10, further comprising:

disposing an adhesive layer on the first surface of the substrate, wherein the adhesive layer includes a second opening, and the conductive through hole is exposed in the second opening.

16. The method for manufacturing the connector of claim 15, wherein after inserting the pin into the conductive through hole, the anchor member directly contacts the adhesive layer.

17. The method for manufacturing the connector of claim 10, wherein inserting the pin into the conductive through hole comprises keeping moving the pin into the conductive through hole until the pin directly contacts the conductive through hole.

18. The method for manufacturing the connector of claim 10, further comprising:

providing a second coverlay and a plurality of second spring contacts attached to the second coverlay, wherein the second coverlay is substantially identical to the first coverlay, and the plurality of second spring contacts is substantially identical to the plurality of first spring contacts; and disposing the second coverlay and the plurality of second spring contacts attached to the second coverlay onto the second surface of the substrate when disposing the first coverlay and the plurality of first spring contacts attached to the first coverlay onto the first surface of the substrate.

* * * * *